United States Patent
Kleinert

[11] Patent Number: 6,109,306
[45] Date of Patent: Aug. 29, 2000

[54] KINK-RESISTANT, HIGH PRESSURE HOSE CONSTRUCTION HAVING A COMPOSITE, SPIRAL WOUND INNERMOST REINFORCEMENT LAYER

[75] Inventor: Helmut Kleinert, Lampertheim Hüttenfeld, Germany

[73] Assignee: Parker Hannifin GmbH, Lampertheim, Germany

[21] Appl. No.: 09/318,306

[22] Filed: May 25, 1999

Related U.S. Application Data

[60] Provisional application No. 60/090,985, Jun. 29, 1998.

[51] Int. Cl.⁷ .................................................. F16L 11/04
[52] U.S. Cl. ......................... 138/127; 138/130; 138/125; 138/174
[58] Field of Search .................................... 138/172, 127, 138/124, 125, 137, 140, 123, 126, 130, 174

[56] References Cited

U.S. PATENT DOCUMENTS

| | | | |
|---|---|---|---|
| 1,281,557 | 10/1918 | Goodall | 138/133 |
| 2,829,671 | 4/1958 | Ernst et al. | 138/127 X |
| 3,481,368 | 12/1969 | Vansickle et al. | 138/130 X |
| 3,566,924 | 3/1971 | Amburs | 138/130 |
| 3,654,967 | 4/1972 | Atwell et al. | 138/144 |
| 3,790,491 | 2/1974 | Atwell et al. | 138/130 X |
| 3,791,415 | 2/1974 | Lawless et al. | 138/127 |
| 3,805,848 | 4/1974 | Chrow | 138/137 |
| 3,905,398 | 9/1975 | Johansen et al. | 138/124 |
| 4,175,992 | 11/1979 | Grawey | 138/129 X |
| 4,241,763 | 12/1980 | Antal et al. | 138/127 |
| 4,259,991 | 4/1981 | Kutnyak | 138/127 |
| 4,317,000 | 2/1982 | Ferer | 138/130 X |
| 4,343,333 | 8/1982 | Keister | 138/125 |
| 4,384,595 | 5/1983 | Washkewicz | 138/127 |
| 4,444,707 | 4/1984 | Schwarz | 264/103 |
| 4,537,222 | 8/1985 | Schwarz | 138/130 |
| 4,585,035 | 4/1986 | Piccoli | 138/127 |
| 4,669,178 | 6/1987 | Washkewicz et al. | 138/125 |
| 4,850,395 | 7/1989 | Briggs | 138/130 |
| 4,898,212 | 2/1990 | Searfoss et al. | 138/130 |
| 4,952,262 | 8/1990 | Washkewicz et al. | 156/149 |
| 5,024,252 | 6/1991 | Ochsner | 138/130 |
| 5,062,456 | 11/1991 | Cooke et al. | 138/125 |
| 5,361,806 | 11/1994 | Lalikos et al. | 138/109 |
| 5,655,572 | 8/1997 | Marena | 138/127 X |
| 5,665,293 | 9/1997 | Karageorgious et al. | 264/103 |

Primary Examiner—Patrick Brinson
Attorney, Agent, or Firm—John A. Molnar, Jr.

[57] ABSTRACT

A kink-resistant hose construction adapted for conveying fluids under high pressure which is flexible intermediate a central longitudinal axis to a minimum bend radius. The construction includes a thermoplastic core having an inner surface defining the inner diameter of the hose and an outer surface, and an innermost reinforcement layer disposed radially circumferentially about the outer surface of the core. The innermost reinforcement layer is formed as a composite of at least one metallic wire element and at least one non-metallic fiber element. The metallic wire element is wound helically in one direction over the outer surface of the core at a predetermined pitch angle measured relative to the longitudinal axis to define a series of first turns. Each of these first tuns is spaced-apart from an adjacent first turn to define successive pairs of first turns each having an interstitial area therebetween. The fiber element, in turn, is wound helically over the outer surface of the core in the same direction and at the same pitch angle as the metallic wire element to define a series of second turns each disposed intermediate a corresponding one of the pairs of the first turns or the wire element. The fiber element substantially occupies the interstitial area between each of the pairs of the first turns of the wire element to thereby prevent the wall of the core from being extruded therebetween as the hose is flexed to its minimum bend radius.

27 Claims, 2 Drawing Sheets

KINK-RESISTANT, HIGH PRESSURE HOSE CONSTRUCTION HAVING A COMPOSITE, SPIRAL WOUND INNERMOST REINFORCEMENT LAYER

RELATED CASES

The present application claims priority to U.S. Provisional Application Serial No. 60/090,985 filed Jun. 29, 1998.

BACKGROUND OF THE INVENTION

The present invention relates broadly to a flexible, ultra high pressure reinforced thermoplastic hose construction, and more particularly to such a hose construction which is provided to be especially kink resistant by virtue of having an innermost reinforcement layer which is spiral wound over a tubular core as a composite of metal wire and non-metallic, synthetic fiber elements.

Flexible high-pressure hose is used in a variety of fluid transfer applications such as in the water blast removal of paint or concrete, and in sewer cleaning operations. As used herein, "high-pressure" is ascribed herein its common trade definition of hydraulic pressures greater than about 10 MPa, with "ultra" high being used herein to designate pressures greater of about 100 MPa or more.

In basic structure, hoses of the type herein involved typically are constructed as having a tubular core surrounded by one or more reinforcement layers or courses of high tensile strength steel wire and/or synthetic fiber. The reinforcement layers, in turn, are protected by a surrounding outer sheath or cover which may be of the same or different material as the core tube. The cover also provides the hose with increased abrasion resistance.

The core tube, which may be a thermoplastic material such as a polyamide, polyolefin, polyvinyl chloride, or polyurethane, or a synthetic rubber material such as Buna N or neoprene, is conventionally extruded and cooled or cured. As is detailed in U.S. Pat. Nos. 3,116,760; 3,159,183; 3,966,238; 4,952,262, if necessary, the tube may be crosshead extruded over a mandrel for support, or otherwise supported in later forming operations using air pressure and/or reduced processing temperatures.

From the extruder, the tube may be collected on a reel or other take-up device for further processing. As dispensed from the reel, the tube optionally next may be passed through an applicator for its coating with an outer layer of an adhesive material which, in the case of thermoplastic hose, may be a polyurethane or other isocyanate-based adhesive, or, in the case of "rubber," i.e., vulcanizable elastomeric, hose, an vulcanizable adhesion promoter. The core tube then may be delivered through a braider and/or a spiral winder for its reinforcement with one or more surrounding layers of wire and/or fibrous material such as a monofilament, yarn, or roving. These reinforcement layers, which are applied under tension and which may be bonded to the core and to adjacent reinforcement layers, typically comprise an interwoven braid or a spiral winding of a nylon, polyester, or aramid yarn, or a high tensile steel or other metal wire.

Following the application of the reinforcement layers, the outer cover or sheath optionally may be applied. Such cover, which may be formed as a cross-head extrusion or a spiral-wound wrapping, typically comprises an abrasion-resistant polymeric material such as a polyamide, polyolefin, polyvinyl chloride, or polyurethane. As before, an adhesive layer may be used to bond the outer cover to the reinforcement layers.

Representative high-pressure spiral wound and other hose constructions, as well as manufacturing methods therefor, are shown in U.S. Pat. Nos. 4,384,595; 4,537,222; 4,317,000; 3,791,415; 4,175,992; 4,241,763; 4,585,035; 5,024,252; 4,952,262; 4,444,707; 3,805,848; 3,790,419; 3,566,924; 5,361,806; 3,654,967; 4,259,991; 4,850,395; 3,905,398; 5,062,456; 4,898,212; 4,699,178; and 4,343,333. Heretofore, however, it is believed that an ultra high pressure hose, that is, having a working pressure of about 100 MPa or more which was both flexible and highly kink resistant was unknown in the art. That is, although high pressure hoses could be made kink-resistant by increasing the wall thickness thereof with thicker core tubes and additional reinforcement layers, such hoses could not be considered "flexible" in failing to meet commercial bend radius requirements. By "kinking," it is meant that the wall of the hose is pinched or otherwise collapses to close or otherwise restrict the inner diameter of the hose.

Further with respect to high pressure thermoplastic hose constructions, it is known that the high strength thermoplastic materials used in such constructions are, necessarily, rigid. In service, high pressure thermoplastic hoses, and particularly such hoses utilizing multiple steel wire reinforcement layers and higher performance thermoplastics such as polyamides, therefore may exhibit relatively poor flexural properties as compared to rubber hose.

In view of the foregoing, it will be appreciated that ultra high pressure hose constructions must exhibit a demanding balance of mechanical and other physical properties for proper performance. Indeed, as commercial applications for ultra high pressure hoses have increased as a less labor intensive and, therefore, more economical substitute for rigid metal pipe, there have been calls from industry for further improvements in such hoses and in the materials of construction therefor. Especially desired would be a construction which is flexible, yet resistant to kinking in critical applications such as waster blasting and sewer cleaning.

BROAD STATEMENT OF THE INVENTION

The present invention is directed to an ultra high pressure hose construction which exhibits a unique combination of flexibility and kink resistance. For example, at representative inner diameters of between about 4–32 mm and outer diameters of between about 9–50 mm, the hose construction of the present invention is highly flexible in being observed to have a relatively tight minimum bend radius of between about 30–180 mm. Advantageously, the hose construction of the present invention additionally is observed to be exceptionally resistant to kinking notwithstanding its tight minimum bend radius.

In a preferred embodiment, the hose construction of the present invention utilizes an innermost reinforcement layer which is spiral, i.e., helically, wound over a tubular core as a composite of metal wire and non-metallic, preferably synthetic fiber elements which may be in the form of one or more ends of a multi-filament strand as in a twisted or untwisted yarn, thread, or tape. Without being bound by theory, it is believed that the fiber elements minimize the incidence of plastic deformation of the hose in exhibiting a degree of resiliency or radial expansion which fills the spaces between adjacent turns of the more structural or load bearing wire helix as the hose is flexed along a bend radius. That is, as the hose is flexed longitudinally along a bend radius, the wall thereof is elongated along the outer diameter of the radius, and is contracted along the inner diameter of the radius. Concomitantly, the wire helix, which functions much like a spring, is extended along the outer diameter of the radius, such that the axial spaces between adjacent turns is increased, and is contracted along the inner diameter of the radius. The fiber elements, however, are able to expand radially to substantially fill the axial spaces between the wire turns along the outer diameter of the bend radius to thereby the prevent the wall of the core tube from being extruded therebetween. In this way, the structural integrity of the hose is maintained without sacrificing flexibility or high pressure performance.

The innermost composite reinforcement layer may be spiral wound from between about 1–20 parallel, axially spaced-apart ends of a 0.3–0.9 mm diameter steel monofilament wire element, with the fiber element being provided as being wound from a corresponding number of parallel, spaced-apart ends of an untwisted, 1100–8800 decitex aromatic polyamide or "aramid" yarn. One or more conventional aramid or monofilament or stranded steel wire reinforcement layers additionally may be spiral wound contrahelically, i.e., in alternating pitch directions, between the innermost composite reinforcement layer and an outer cover. Both the cover and the inner, tubular core of the hose may be formed of a thermoplastic material which, for the core, may be a nylon such as Nylon 12, and for the cover may be a thermoplastic polyurethane (TPU).

It is, therefore, a feature of a disclosed embodiment of the present invention to provide a kink-resistant hose construction adapted for conveying fluids under high pressure which is flexible intermediate a central longitudinal axis thereof to a minimum bend radius. Such construction includes a tubular core having an inner surface defining the inner diameter of the hose and an outer surface, and an innermost reinforcement layer disposed radially circumferentially about the outer surface of the core. The innermost reinforcement layer is formed as a composite of at least one metallic wire element and at least one non-metallic, preferably synthetic, fiber element. The metallic wire element is wound helically in one direction over the outer surface of the core at a predetermined pitch angle measured relative to the longitudinal axis to define a series of first turns. Each of these first tuns is spaced-apart from an adjacent first turn to define successive pairs of first turns each having an interstitial area therebetween. The fiber element, in turn, is wound helically over the outer surface of the core in the same direction and at substantially the same pitch angle as the metallic wire element to define a series of second turns each disposed intermediate a corresponding one of the pairs of the first turns or the wire element. The fiber element substantially occupies the interstitial area between each of the pairs of the first turns of the wire element to thereby prevent the side wall of the core from being extruded therebetween as the hose is flexed to its minimum bend radius.

It is a further feature of a disclosed embodiment of the invention to provide an innermost reinforcement layer for a kink-resistant hose adapted for conveying fluids under high pressure. The reinforcement layer is disposed radially circumferentially about the outer surface of the tubular core of the hose and includes at least one metallic wire element and at least one non-metallic, preferably synthetic fiber element. The metallic wire element is wound helically in one direction over the outer surface of the core at a predetermined pitch angle measured relative to the longitudinal axis to define a series of first turns. Each of these first tuns is spaced-apart from an adjacent first turn to define successive pairs of first turns each having an interstitial area therebetween. The fiber element, in turn, is wound helically over the outer surface of the core in the same direction and at substantially the same pitch angle as the metallic wire element to define a series of second turns each disposed intermediate a corresponding one of the pairs of the first turns or the wire element. The fiber element substantially occupies the interstitial area between each of the pairs of the first turns of the wire element to thereby prevent the side wall of the core from being extruded therebetween as the hose is flexed to a minimum bend radius.

The present invention, accordingly, comprises the apparatus possessing the construction, combination of elements, and arrangement of parts which are exemplified in the detailed disclosure to follow. Advantages of the present invention include a ultra high pressure hose construction which is flexible but also highly kink resistant. Additional advantages include an ultra high pressure hose construction which is light weight and affords easy handling, and which has an improved service life. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
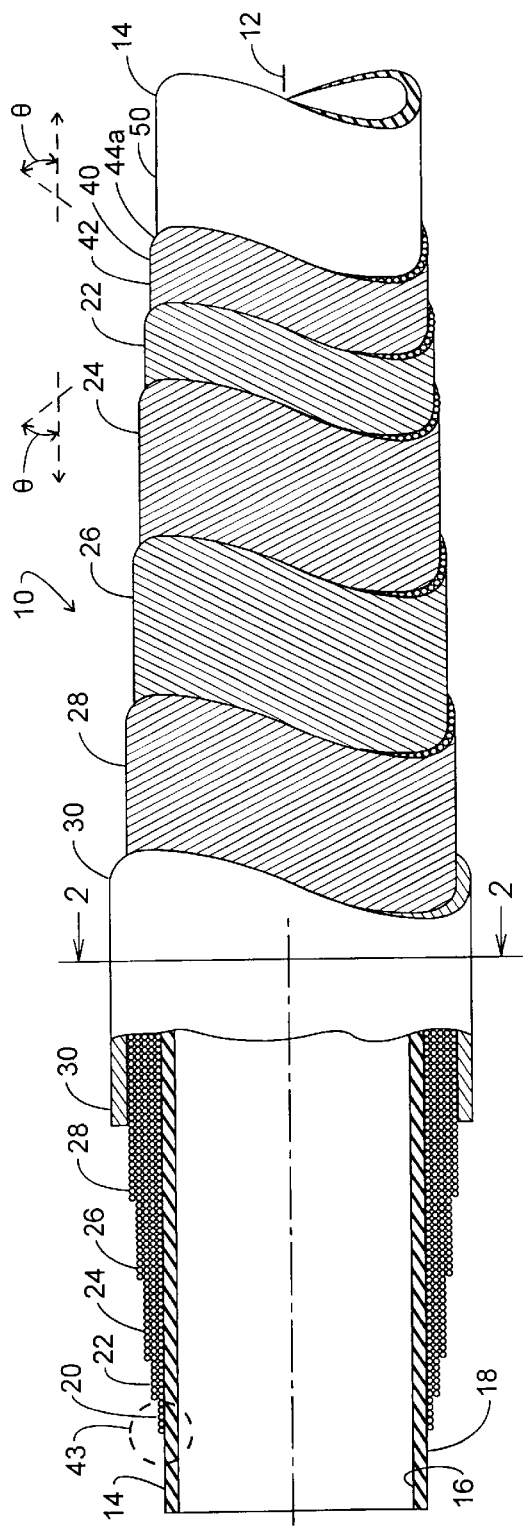
FIG. 1 is a side elevational view shown in both axial cross-section and cut-away of an ultra high pressure hose constructed in accordance with the present invention as including an innermost reinforcement layer which is spiral wound over a tubular core as a composite of metal wire and non-metallic, synthetic fiber elements.

The drawings will be described further in connection with the following Detailed Description of the Invention.

DETAILED DESCRIPTION OF THE INVENTION

Certain terminology may be employed in the description to follow for convenience rather than for any limiting purpose. For example, the terms "upper" and "lower" designate directions in the drawings to which reference is made, with the terms "inner" or "interior" and "outer" or "exterior" referring, respectively, to directions toward and away from the center of the referenced element, and the terms "radial" and "axial" referring, respectively, to directions perpendicular and parallel to the longitudinal central axis of the referenced element. Terminology of similar import other than the words specifically mentioned above likewise is to be considered as being used for purposes of convenience rather than in any limiting sense.

For the purposes of the discourse to follow, the precepts of the composite reinforcement layer of the invention herein involved are described in connection with its utilization within a representative hose construction adapted particularly for use water blast or sewer cleaning. It will be appreciated, however, that aspects of the present invention may find use in other hose constructions for like ultra high pressure fluid conveying applications. Use within those such other applications therefore should be considered to be expressly within the scope of the present invention.

Figure 2:
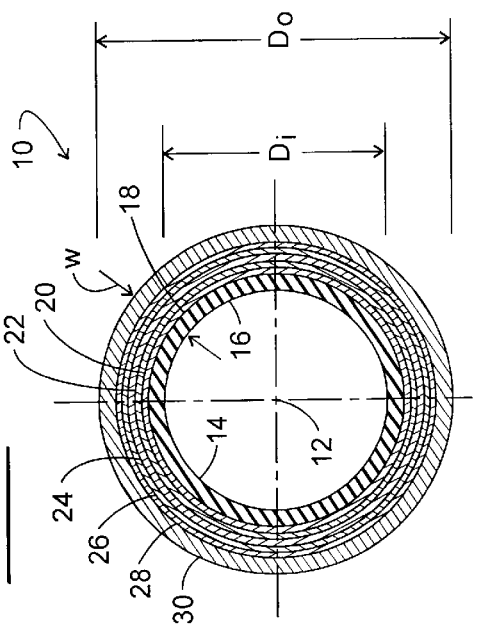
FIG. 2 is a radially cross-sectional view of the hose construction of FIG. 1 taken through line 2—2 of FIG. 1.

Referring then to the figures wherein corresponding reference numbers are used to designate corresponding elements throughout the several views, a representative ultra high pressure hose according to the present invention is shown generally at 10 in the cut-away views of FIG. 1 and in the cross-sectional view of FIG. 2. In basic dimensions, hose 10 extends axially to an indefinite length along a central longitudinal axis, 12, and has a select inner and outer diameter referenced, respectively, at "$D_i$" and "$D_o$" in the radial cross-sectional view of FIG. 2. The inner and outer diameter dimensions may vary depending upon the particular fluid conveying application involved, but generally will be between about 4–32 mm for inner diameter $D_i$, and about 9–50 mm for outer diameter $D_o$, with a overall wall thickness, "w," therebetween of between about 2.5–9 mm.

As may be seen in the different views of FIGS. 1 and 2, hose 10 is constructed as being formed about a tubular core, 14. Conventionally, core 14 may be provided as extruded from a thermoplastic material, such as a polyolefin, polyester, fluoropolymer, polyvinyl chloride, thermoplastic rubber, or polyurethane, or, preferably, a polyamide such as Nylon 12, which is selected for chemical compatibility with the fluid being handled. Alternatively, core 14 may be extruded of a vulcanizable, i.e., thermosetting, natural or synthetic rubber such as SBR, polybutadiene, EPDM, butyl, neoprene, nitrile, polyisoprene, buna-N, copolymer rubbers, or blends such as ethylene-propylene rubber. Core 14 has an inner surface, 16, defining the inner diameter Di of the hose 10, and an outer surface, 18. As with the overall dimensions of hose 10, the wall thickness of core 14 may vary for the particular application envisioned, but typically will be between about 0.8–2.0 mm. Core 14 may be formed of a unitary, single-layer construction or, alternatively, of a composite, multi-layer construction. In such multi-layer construction, core 14 may include an inner liner, referenced in phantom at 19, which is formed of a fluoropolymer or other chemically-resistant material.

Core 14 is surrounded by a composite, innermost reinforcement layer, referenced generally at 20, which is disposed radially circumferentially about the core outer surface 18, and one or more intermediate reinforcement layers, 22, 24, 26, and 28, each superimposed about the innermost reinforcement layer 20. As will be detailed hereinafter, each of the intermediate reinforcement layers may be spiral wound or, alternatively, braided or knitted of one or more monofilament, continuous multi-filament, or short "staple" strands of a synthetic fiber material, which may be a nylon, polyester, or aramid, a steel or other metal wire material, or a blend thereof. With respect to spiral wound layers, such layers may be oppositely wound in pairs so as to counterbalance the torsional twisting which may occur when the hose is pressurized, and also may be of the composite construction which is detailed hereinafter in connection with innermost layer 20.

The reinforcement layers, in turn, are sheathed within a coaxially surrounding outermost layer, 30, which is provided as a cover or jacket for hose 10. In this regard, outermost cover layer 30 may be cross-head or otherwise extruded, or wrapped or braided over the reinforcement layers as a 1.0–2.5 mm thick layer, tape, or braid of an abrasion-resistant thermoplastic material such as a polyamide, polyolefin, polyester, polyvinyl chloride, or, preferably, a thermoplastic polyurethane (TPU) elastomer. By "abrasion-resistant," it is meant that such thermoplastic material for forming cover 30 has a hardness or durometer of between about 60–90 Shore A. As with core 14, cover layer 30 alternatively may be formed of a natural or synthetic rubber such as SBR, polybutadiene, EPDM, butyl, neoprene, nitrile, polyisoprene, silicone, fluorosilicone, buna-N, copolymer rubbers, or blends such as ethylene-propylene rubber.

In accordance with the present invention, innermost reinforcement layer 20, is formed of at least one metallic wire element, 40, and at least one non-metallic, preferably synthetic, fiber element 42, each of which is spiral, i.e., helically, wound under tension in a contiguous relationship and in one direction, i.e., either left or right hand, over the outer surface 18 of core 14. That is, each of elements 40 and 42 may be provided as from 1–20, axially spaced-apart, parallel strands or "ends" which may be monofilaments or multifilament threads, yarns, or tapes. Each of these ends, in turn, are individually spirally wound as issued from separate spools or bobbins over the core 14 in an alternating, parallel orientation to form layer 20. Within the spiral winder, which may have 24–64 carriers per deck, alternating spools of the wire and fiber elements may be employed to develop the composite layer structure detailed herein. Alternatively, either of the elements 40 or 42 may be first wound in an open layer over the core 14, with the other layer being wound in a parallel therebetween. Elements 40 and 42 also may be co-spooled as separate plies or ends on common bobbins.

In a preferred construction, wire element 40 is provided as twelve ends of a monofilament carbon or stainless steel wire having a generally circular cross-section with a diameter of between about 0.3–0.9 mm, and preferably about 0.6 mm, and a tensile strength of between about 2500–3000 $N/mm^2$. These element 40 are applied at a predetermined pitch angle, referenced at θ in FIG. 1, measured relative to the longitudinal axis 12 of the hose 10. For typical applications, the pitch angle θ will be selected to be between about 40–60°.

Particularly, the pitch angle θ may be selected depending upon the desired convergence of strength, elongation, and volumetric expansion characteristics of hose 10. In generally, the higher pitch angles result in decreased radial expansion of the hose under pressure, but in increased axial elongation. For high pressure applications, a "neutral" pitch angle of about 52° generally is preferred as minimizing elongation to about 3% of the original hose length. Alternatively, a pitch angle slightly greater than neutral may be employed to develop a radially-inwardly directed force component for more efficient load transfer.

Figure 3:
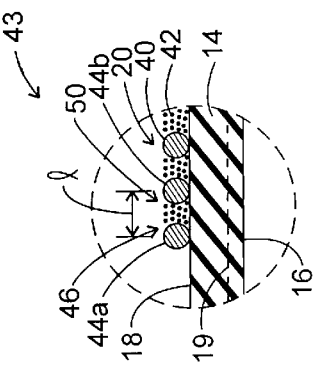
FIG. 3 is an axial cross-sectional view of the composite innermost reinforcement layer of FIG. 1 which is magnified to reveal the details of the structure thereof.

Elements 40, as may be seen best in the cut-away view of FIG. 1, further are applied over the core 14 at less than 100% coverage thereof, and preferably at a coverage of between about 95–98%. In this way, the open helix so formed is defined by a series of first turns. With momentary reference to the magnified axial cross-sectional view shown at 43 in FIG. 3, each of these first turns may be seen to be spaced-apart by an axial distance, referenced at "l," of between about 0.6–1.8 mm from an adjacent, i.e., contiguous, turn to defines successive pairs thereof, one of which pairs is referenced at 44a–b. An interstitial area, referenced at 46, thereby is defined between the adjacent turns in each of these pairs 44. With the wire element 40 preferably being provided, as is shown, as having a generally circular cross-sectional geometry, the interstitial area 46 defined between the adjacent turns pairs 44 normally will assume a generally hyperbolic cross-sectional geometry. Wire element 40 alternatively may be provided as having a "flat-wire" construction with a generally rectangular, square, oval, or elliptical cross-section.

Returning to FIGS. 1 and 2, a corresponding number of ends of synthetic, non-metallic fiber elements 42 may seen to be applied at substantially the same pitch angle θ as wire elements 40 in being wound helically in the same direction over the core outer surface 18. In this regard, fiber elements 42 similarly form an open helix defined by a series of second tuns, one of which is referenced at 50. In accordance with the precepts of the present invention, each of these second turns 50 is disposed intermediate a corresponding pair 44 of adjacent first turns to form the composite structure of the innermost reinforcement layer 20 which, with the wire and fiber elements 40 and 42, forms a substantially closed layer over the core outer surface 18. As may be seen best with momentary reference again to FIG. 3, the interstitial area between each of the first turn pairs 44 is substantially filled by the fiber elements 42. That is, with respect to the axial spacing of the wire elements 40, the fiber elements 42 are selected to occupy, in an uncompressed state, a greater cross-sectional area than the interstitial area 46, but to be compressed by between about 10–60%, or otherwise resiliently deformably received, between each corresponding first turn pair 44. As is detailed hereinafter, fiber elements 42 additionally are selected to be both expandable or otherwise recoverable, and further compressible between turn pairs 44 to accommodate the flexure of the hose 10 about a minimum bending radius.

In the preferred construction illustrated herein, each of the fiber elements 42 is provided as a multi-filament strand, i.e., yam, thread, tape, or ply of an aromatic polyamide or "aramid" material having a fiber size or "decitex" of at least about 5000, with higher numbers being indicative of "heavier" yams of more multi-filaments. Although natural or other synthetic fibers, such as polyesters and other polyamides such as nylons, may be substituted, an aramid material is preferred as affording, as compared to such other fibers, superior load bearing and dimensional stability, both radial and axial, within the hose constructions herein involved. In this regard, aramid fibers, as marketed commercially under the tradenames Kevlar® and Nomex® (E.I. DuPont de Nemours and Co., Wilmington, Del., USA) and Twaron® (Akzo Nobel, Arnhem, The Netherlands), exhibit a relatively high tensile modulus or tenacity of about 190 cN/tex and a relatively low stretch with an elongation at break of about 3%.

Further in the preferred embodiment, the fiber elements 42 may be wound as having a twist of between 0 and about 200 turns per meter which may be in either the clockwise or counterclockwise direction as supplied by the manufacturer, i.e., manufacturer's twist, or as is imparted as the strands are spooled. As is known in the art, the fiber twist may be varied, for example, to optimize the flexural fatigue resistance of the hose or to minimize the hose diameter. For reasons of cost and increased compressibility, however, it is preferred that fiber elements 42 have no or "zero" twist, or a relatively low twist of about 60 turns per meter or less.

Figure 4:
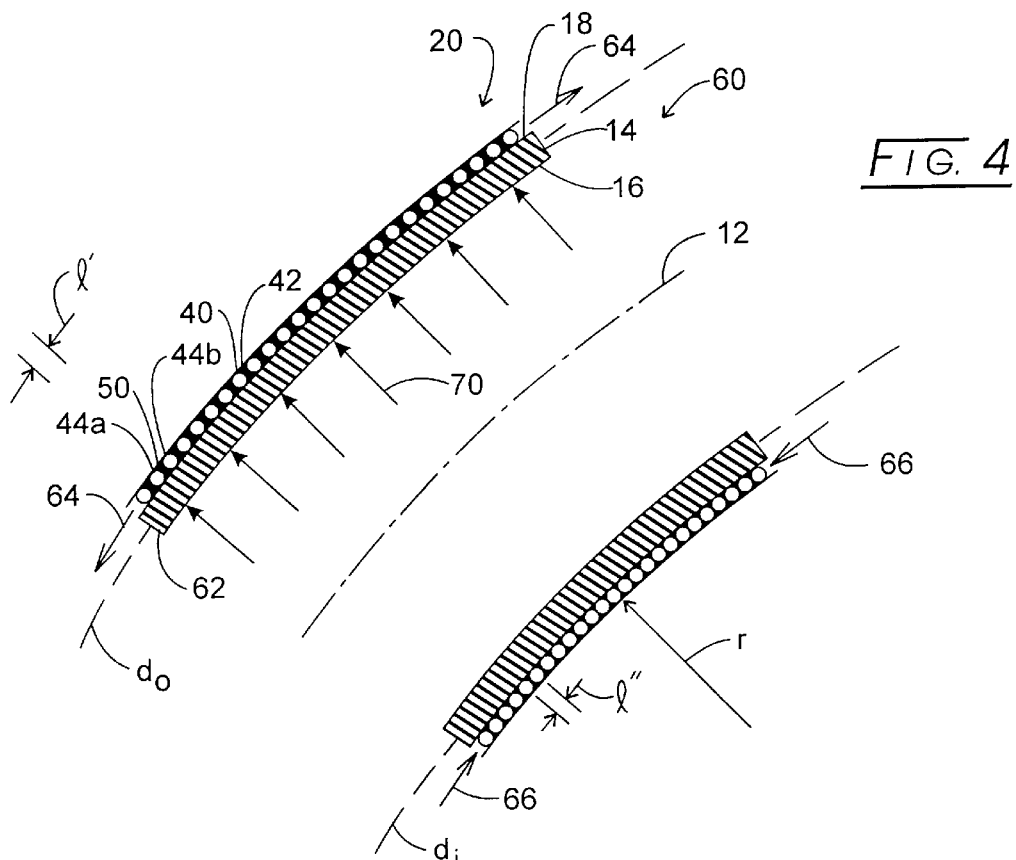
FIG. 4 is a schematic, axial cross-sectional view illustrating the orientation of the turns of the innermost, spiral wound composite reinforcement layer of a hose construction representative of the present invention as such hose is flexed along a minimum bend radius.

Turing next to FIG. 4, a better appreciation of the functioning of the composite innermost reinforcement layer 20 of the present invention may be had with reference to the somewhat schematic, axial cross-sectional view of a segment, designated generally at 60, of a length of hose 10 which has been flexed along longitudinal axis 12 to a minimum bend radius, referenced at "r." As may be seen, bend radius r is defined relative to tubular core 14 as having an outer diametric component, shown in phantom at "$d_o$," and an inner radius component, shown in phantom at "$d_i$." As hose 10 is flexed along axis 12 to its minimum bend radius r, the side wall, 62, of core 14 is locally elongated, as is shown by arrows 64, along the outer component $d_o$ of the radius, and is locally contracted, as is shown by arrows 66, along the inner component $d_o$ thereof. Concomitantly therewith tube wall 62, the spring-like, helical wire reinforcement elements 40 are extended along the outer diameter of the radius, such that the axial spacing, referenced at "l," between adjacent turns 44 is increased, and are contracted along the inner diameter of the radius, such that the axial spacing, referenced at "l," between adjacent turns 44 is decreased. The fiber elements 42, however, in being resiliently compressibly received between each turn pair 44, are able to expand or otherwise recover at least a portion of their original cross-sectional area in continuing to occupy substantially the entirety of the interstitial area 46 between the turn pairs 44 along the outer diameter of the bend radius. Additionally, fiber elements 42 are further compressible between each turn pair 44 to accommodate the contraction thereof along the inner diameter of the bend radius.

Without being bound by theory, it is believed that with the axial spacing between adjacent wire turns 44 being filled by the recovery of the fiber elements 42, the core side wall 62 is retained within the innermost reinforcement layer 20 to thereby minimize "kinking," i.e., the collapse of core wall 62 resulting in the constriction or complete blocking of the hose inner diameter. That is, with fluid pressure within the hose exerting, as is shown by the arrows collectively referenced at 70, a radially outwardly directed force on the core side wall 62, extrusion of the core between the wire turns 44 is prevented by the fiber elements. Moreover, with the fiber elements 42 being further compressible along the inner diametric component of the bend radius, smaller radii ultimately may be achieved as compared to conventional hose constructions utilizing an innermost reinforcement layer which is spiral wound entirely of metal wire elements. Thus, the composite reinforcement structure of the present invention allows hose constructions with improved structural integrity without sacrificing flexibility or high pressure performance.

Figure 5:
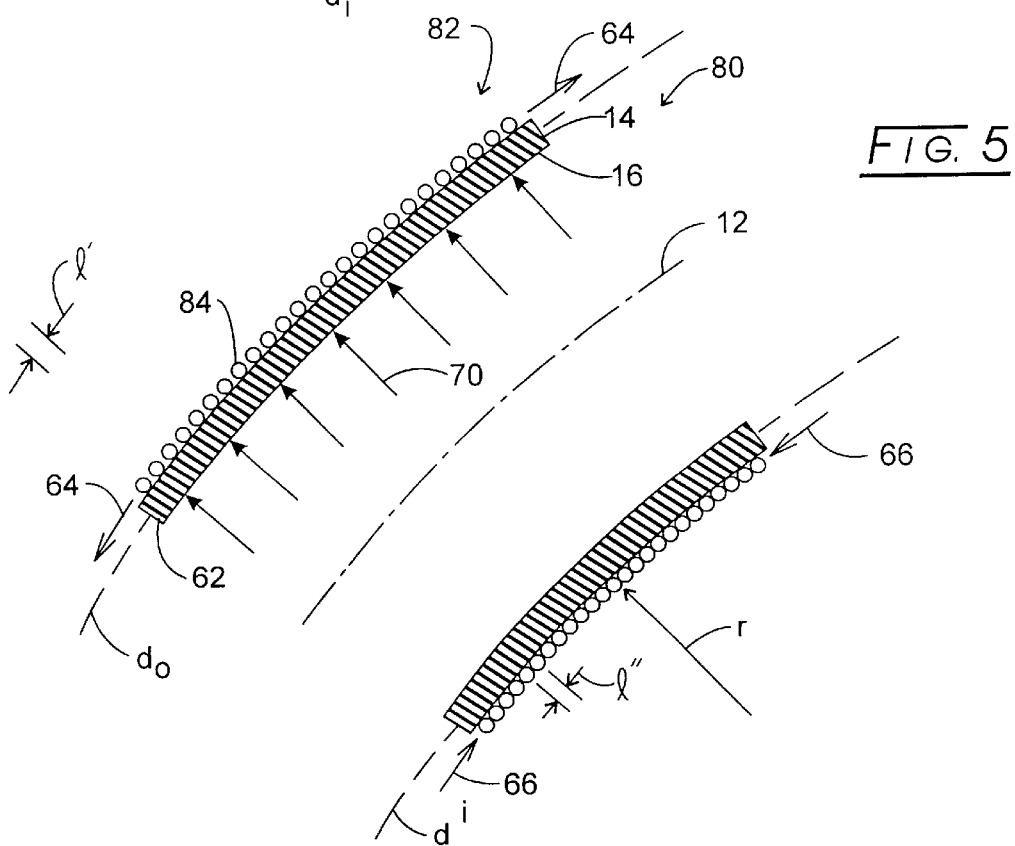
FIG. 5 is a comparative axial cross-sectional view illustrating the orientation of the turns of an innermost, spiral wound metal wire reinforcement layer of a hose construction representative of the prior art as such hose is flexed along a minimum bend radius.

By way of comparison, reference next may be had to FIG. 5, wherein a segment of a representative conventional hose construction is shown generally at 80 as having an innermost reinforcement layer, 82, which is spiral wound entirely of metal wire elements, 84. As before, as the hose is flexed along axis 12 to its minimum bend radius r, the wire reinforcement elements 84 are extended along the outer diameter of the radius, and are contracted along the inner diameter of the radius. However, with no fiber elements to fill the elongated axial spacings l along the outer bend diameter, localized areas of stress concentrations may be developed with the potential for extrusion of the core 14 between the turns of the wire helix. Although the axial spacings may be decreased with, for example, a closer winding of the wire elements 84 to improve kink-resistance, such improvement is at the sacrifice of decreased flexibility and increased weight.

Indeed, within commercial hose constructions having a nominal inner diameter of between about 4–32 mm and a nominal outer diameter of between about 9–50 mm, bend radii of between about 60–400 mm have been achieved at pressure ratings of over 100 MPa using the composite innermost reinforcement layer of the present invention. Such radii are almost twice as tight as would be expected using conventional reinforcement technology, and may be attained with 50% less weight as compared to an all metal wire innermost reinforcement layer construction. In this regard, the performance of hoses using the composite round wire and aramid fiber reinforcement of the present invention can approach that of state-of-the-art "flat-wire" reinforced hose, but with lower cost and faster production capabilities.

Returning to FIGS. 1 and 2, intermediate reinforcement layer 22 may be seen to be provided, preferably, as an open layer which contra-helically wound at a reverse pitch angle, referenced at θ', of preferably between about −40° to −60° over innermost layer 20 from one or more ends of a untwisted aramid fiber yarn or tape, such as an 840 decitex, Kevlar® type 1000 (DuPont). In being spiral wound over innermost reinforcement layer 20 in an opposite direction, intermediate fiber layer 22 both stabilizes preceding layer 20 and provides a carrier for succeeding layer 24.

Intermediate layer 24, in turn, preferably is provided as a closed, generally incompressible spiral layer which again is laid over layer 22 in the opposing direction. For maximum load bearing capability, layer 24 is wound from steel wire having, for example, a diameter of about 0.6 mm and a tensile strength of between about 2500–3000 N/mm$^2$.

Lastly, intermediate layers 26 and 28 may be wound, again in opposing directions, as open spiral layers from a stranded wire material which may consist of, for example, four strands of a 175 mm diameter steel wire. Such layers provide additional load bearing capability and kink resistance, and also provide a foundation for the bonding of the outermost cover layer 30. The result, ultimately, is an efficiently loaded hose structure 10.

As wound in opposing directions over innermost reinforcement layer 20, intermediate layers 22, 24, 26, and 28 may be disposed at the same or different absolute pitch angle. In this regard, it is known that the pitch angles of respective reinforcement layers may be varied to affect the physical properties of the hose. In a preferred construction, however, the pitch angles of reinforcement layers 20, 22, 24, 26, and 28 are provided to about the same, but as reversed in successive layers.

In a preferred embodiment, hose 10 is provided as an entirely thermoplastic construction affording generally higher strength and chemical resistance as compared to rubber hose. In this regard, the use of a combination of steel and aramid reinforcement layers advantageously dispenses with the need to provide separate adhesive or vulcanization layers to prevent the reinforcement layers from unraveling and to assure load transfer. Maximum flexibility thereby may be maintained even for constructions designed for use at relatively high operating pressures.

Thus, an illustrative hose construction is described which results in efficient load transfer between the respective component layers thereof. Such a construction is particularly adapted for high pressure applications and, as a result of a unique innermost reinforcement layer construction, exhibits greater flexibility and kink resistant at less weight than the high pressure hoses heretofore known in the art.

Although the illustrative hose construction 10 has been described wherein the composite reinforcement of the present invention is disposed as an innermost layer about core 14, other arrangements may be envisioned based upon the disclose contained herein. For example, two or more composite reinforcement layers may be provided either as innermost or intermediate layers. In particular, one or more intermediate reinforcement layers may be interposed between the core and a first composite layer and without departing from the scope of the invention herein involved.

As it is anticipated that certain changes may be made in the present invention without departing from the precepts herein involved, it is intended that all matter contained in the foregoing description shall be interpreted as illustrative and not in a limiting sense. All references cited herein are expressly incorporated by reference.

What is claimed is:

1. A kink-resistant hose adapted for conveying fluids under high pressure having a select inner and outer diameter and extending to an indefinite length along a central longitudinal axis, said hose being flexible intermediate said longitudinal axis to a minimum bend radius having an outer diametric component and an inner diametric component, and comprising:

a tubular core having an inner surface defining the inner diameter of said hose and an outer surface; and at least one composite reinforcement layer disposed radially circumferentially about the outer surface of said core, said composite reinforcement layer being formed of: (i) at least one metallic wire element wound helically in one direction over the outer surface of said core at a predetermined pitch angle measured relative to said longitudinal axis in a series of first turns each being spaced-apart from an adjacent first turn to define an interstitial area therebetween; and (ii) at least one non-metallic fiber element wound helically in said one direction over the outer surface of said core at said predetermined pitch angle to define a series of second turns each disposed intermediate a corresponding pair of adjacent said first turns, said fiber element being compressed between each said corresponding pair of said first turns, whereby, as said hose is flexed to said minimum bend radius, said fiber element is expandable to substantially occupy the interstitial area between each said corresponding pair of said first turns along the outer diametric component of said bend radius effective to retain said core within said composite reinforcement layer, and said fiber element is further compressible between each said corresponding pair of said first turns along the inner diametric component of said bend radius.

2. The hose of claim 1 wherein said interstitial area between each said pair of said first turns has a generally hyperbolic cross-sectional geometry.

3. The hose of claim 1 wherein each said wire element is a monofilament strand having a generally circular cross-sectional geometry.

4. The hose of claim 3 wherein each said monofilament strand has a diameter of between about 0.3–0.9 mm.

5. The hose of claim 3 wherein each said monofilament strand is formed of a steel material.

6. The hose of claim 1 wherein each said fiber element comprises one or more multi-filament strands each having a decitex of at least about 1100–8800.

7. The hose of claim 6 wherein each of said multi-filament strands is formed of an aramid material.

8. The hose of claim 6 wherein each of said multi-filament strands has a twist of between 0 and about 60 turns per meter.

9. The hose of claim 1 wherein said pitch angle is between about 40–60°.

10. The hose of claim 1 having an inner diameter of between about 4–32 mm, an outer diameter of between about 9–50 mm, and a minimum bend radius of between about 30–180 mm.

11. The hose of claim 1 wherein said core is formed of a thermoplastic material selected from the group consisting of polyamides, polyolefins, polyvinyl chloride, polyurethanes, and copolymers and blends thereof.

12. The hose of claim 1 wherein one said composite reinforcement layer is disposed as an innermost reinforcement layer about said core.

13. The hose of claim 12 further comprising one or more intermediate reinforcement layers wound in superimposition about said innermost reinforcement layer in a direction opposite to the preceding reinforcement layer.

14. The hose of claim 13 wherein each of said intermediate reinforcement layers is formed of one or more monofilament or multi-filament strands of a material selected from the group consisting of nylons, polyesters, aramids, metal wires, and blends thereof.

15. The hose of claim 1 further comprising an outermost cover coaxially surrounding said reinforcement layer.

16. The hose of claim 15 wherein said cover is formed of a material selected from the group consisting of polyurethanes, polyamides, polyolefins, polyvinyl chloride, polyurethanes, natural and synthetic rubbers, and copolymers and blends thereof.

17. The hose of claim 16 wherein said material has a hardness of between about 60–90 Shore A durometer.

18. A composite reinforcement layer for a kink-resistant hose adapted for conveying fluids under high pressure, said hose being flexible intermediate a central longitudinal axis to a minimum bend radius having an outer diametric component and an inner diametric component, and including a tubular core having an inner surface defining the inner diameter of said hose and an outer surface, said composite reinforcement layer being disposed radially circumferentially about the outer surface of the core and comprising:

at least one metallic wire element wound helically in one direction over the outer surface of the core at a predetermined pitch angle measured relative to said longitudinal axis in a series of first turns each being spaced-apart from an adjacent first turn to define an interstitial area therebetween; and at least one synthetic, non-metallic fiber element wound helically in said one direction over the outer surface of the core at said predetermined pitch angle to define a series of second turns each disposed intermediate a corresponding pair of adjacent said first turns, said fiber element being compressed between each said corresponding pair of said first turns, whereby, as the hose is flexed to its minimum bend radius, said fiber element is expandable to substantially occupy the interstitial area between each said corresponding pair of said first turns along the outer diametric component of said bend radius effective to retain the core within said composite reinforcement layer, and said fiber element being further compressible between each said corresponding pair of said first turns along the inner diametric component of said bend radius.

19. The reinforcement layer of claim 18 wherein said interstitial area between each said pair of said first turns has a generally hyperbolic cross-sectional geometry.

20. The reinforcement layer of claim 18 wherein each said wire element is a monofilament strand having a generally circular cross-sectional geometry.

21. The reinforcement layer of claim 20 wherein each said monofilament strand has a diameter of between about 0.35–0.85 mm.

22. The reinforcement layer of claim 20 wherein each said monofilament strand is formed of a steel material.

23. The reinforcement layer of claim 18 wherein each said fiber element comprises one or more multi-filament strands.

24. The reinforcement layer of claim 23 wherein each of said multi-filament strands is formed of an aramid material.

25. The reinforcement layer of claim 23 wherein each of said multi-filament strands has a twist of between 0 and about 60 turns per meter.

26. The reinforcement layer of claim 18 wherein said pitch angle is between about 40–60°.

27. The reinforcement layer of claim 18 which is disposed as an innermost reinforcement layer about the core.

* * * * *